United States Patent
Sullivan

(12) 
(10) Patent No.: US 6,277,921 B1
(45) Date of Patent: *Aug. 21, 2001

(54) HIGH ACID IONOMERS AND GOLF BALL COVER COMPOSITIONS COMPRISING SAME

(75) Inventor: Michael J. Sullivan, Chicopee, MA (US)

(73) Assignee: Spalding Sports Worldwide, Inc., Chicopee, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/601,380

(22) Filed: Feb. 14, 1996

Related U.S. Application Data

(63) Continuation of application No. 08/366,365, filed on Dec. 29, 1994, now abandoned, which is a continuation of application No. 07/901,660, filed on Jun. 19, 1992, now abandoned.

(51) Int. Cl.$^7$ .............................. C08F 220/06; C08F 8/44
(52) U.S. Cl. ...................... 525/330.2; 525/196; 525/221; 525/329.7; 525/330.1; 525/330.3; 525/366; 525/370; 525/919
(58) Field of Search .............................. 525/330.1, 330.3, 525/366, 370, 329.7, 196, 221

(56) References Cited

U.S. PATENT DOCUMENTS

| 3,454,676 | * | 7/1969 | Busse | 525/330.2 |
| 3,472,825 | * | 10/1969 | Walter et al. | 525/330.2 |
| 4,884,814 |  | 12/1989 | Sullivan | 273/235 |
| 4,911,451 |  | 3/1990 | Sullivan et al. | 273/235 |

OTHER PUBLICATIONS

Research Disclosure Document RDO 207,003, Jan. 10, 1989, "Ionomers Obtained from Ethylene–Acrylic or Methacrylic Acid, Useful for Golf Balls, Footwear Ski, Boots, Cosmetic Bottle Cap Closures, etc.".

\* cited by examiner

*Primary Examiner*—Fred Zitomer

(57) ABSTRACT

The present invention is directed to new metal cation neutralized high acid ionomer resins and to golf ball cover compositions containing these new resins. When the new high acid ionomer resins are utilized to manufacture a golf ball, the golf ball produced thereby exhibits properties of improved distance without sacrificing characteristics such as playability and/or durability when compared to low acid ionomer and/or low acid/high acid ionomer blends.

25 Claims, No Drawings

HIGH ACID IONOMERS AND GOLF BALL COVER COMPOSITIONS COMPRISING SAME

This is a file wrapper continuation of application Ser. No. 08/366,365, filed Dec. 29, 1994 now abandoned; which is a file wrapper continuation of application Ser. No. 07/901,660 filed Jun. 19, 1992 now abandoned.

FIELD OF THE INVENTION

The present invention relates to new metal cation neutralized high acid ionomer resins and to improved golf ball covers made from these resins. The improved golf ball covers are useful for producing golf balls, particularly multi-piece balls, exhibiting enhanced travel distance while maintaining the playability and/or durability characteristics necessary for repetitive play.

BACKGROUND OF THE INVENTION

Ionomeric resins are polymers containing interchain ionic bonding. As a result of their toughness, durability, and flight characteristics, various ionomeric resins sold by E. I. DuPont de Nemours & Company under the trademark "Surlyn®" and more recently, by the Exxon Corporation (see U.S. Pat. No. 4,911,451) under the trademarks "Escor®" and the tradename "Iotek", have become the materials of choice for the construction of golf ball covers over the traditional "balata" (trans polyisoprene, natural or synthetic) rubbers. The softer balata covers, although exhibiting enhanced playability properties, lack the durability properties required for repetitive play.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e. improved durability, etc. for golf ball construction over balata.

Broadly, the ionic copolymers comprise one or more alpha-olefins and from about 9 to about 20 weight percent of alpha, beta-ethylenically unsaturated mono- or dicarboxylic acid, the basic copolymer neutralized with metal ions to the extent desired. Usually, at least 20% of the carboxylic acid groups of the copolymer are neutralized by the metal ions (such as sodium, potassium, zinc, calcium, magnesium, and the like) and exist in the ionic state.

Suitable olefins for use in preparing the ionomeric resins include ethylene, propylene, butene-1, hexene-1, and the like. Unsaturated carboxylic acids include acrylic, methacrylic, ethacrylic, α-chloroacrylic, crotonic, maleic, fumaric, itaconic acids, and the like. The ionomeric resins utilized in the golf ball industry are generally copolymers of ethylene with acrylic (i.e. Escor®) and/or methacrylic (i.e. Surlyn®) acid. In addition, two or more types of ionomeric resins may be blended into the cover compositions in order to produce the desired properties of the resulting golf balls.

Along this line, the properties of the cover compositions and/or the ionomeric resins utilized in the golf ball industry vary according to the type and amount of the metal cation, the molecular weight, the composition of the base resin (i.e. the nature and the relative content of the olefin, the unsaturated carboxylic acid groups, etc.), the amount of acid, the degree of neutralization and whether additional ingredients such as reinforcement agents or additives are utilized. Consequently, the properties of the ionomer resins can be controlled and varied in order to produce golf balls having different playing characteristics, such as differences in hardness, playability (i.e. spin, feel, click, etc.), durability (i.e. impact and/or cut resistance), and resilience (i.e. coefficient of restitution).

However, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups), the degree of neutralization and additive ingredients such as reinforcement agents, etc., a great deal of research continues in order to develop golf ball cover compositions exhibiting not only the playability characteristics previously associated with the balata cover, but also the improved impact resistance and carrying distance properties produced by the ionomeric resins. Thus, an object of the present invention is to provide golf ball cover compositions which, when utilized in golf ball construction, produce balls exhibiting improved travel distance while maintaining satisfactory playability and durability properties.

In enhancing the distance a golf ball will travel when hit, there are a variety of factors which are considered. The coefficient of restitution, along with ball size, weight and additional factors such as club head speed, angle of trajectory, and ball aerodynamics (i.e., dimple pattern), generally determine the distance a ball will travel when hit. Since club head speed and the angle of trajectory are not factors easily controllable, particularly by golf ball manufacturers, the factors of concern among manufacturers are the coefficient of restitution and the surface dimple pattern of the ball.

A golf ball's coefficient of restitution (C.O.R.) is the ratio of the relative velocity of the ball after direct impact to that before impact. One way to measure the coefficient of restitution is to propel a ball at a given speed against a hard massive surface, and measure its incoming velocity and outgoing velocity. The coefficient of restitution is defined as the ratio of the outgoing velocity to incoming velocity of a rebounding ball and is expressed as a decimal. As a result, the coefficient of restitution can vary from zero to one, with one being equivalent to an elastic collision and zero being equivalent to an inelastic collision.

The coefficient of restitution of a one-piece golf ball is a function of the ball's composition. In a two-piece or a multi-layered golf ball, the coefficient of restitution is a function of the core, the cover and any additional layer. While there are no United States Golf Association (U.S.G.A.) limitations on the coefficient of restitution values of a golf ball, the U.S.G.A. requires that the golf ball cannot exceed an initial velocity of 255 feet/second. As a result, golf ball manufacturers generally seek to maximize the coefficient of restitution of a ball without violating the velocity limitation.

In various attempts to produce a high coefficient of restitution golf ball exhibiting the enhanced travel distance desired, the golfing industry has blended various ionomeric resins. However, many of these blends do not exhibit the durability and playability characteristics necessary for repetitive play and/or the enhanced travel distance desired.

The present invention is directed to the preparation of new cation neutralized ionomer resins containing relative high amounts of acid (i.e. greater than 16 weight percent acid, preferably from about 17 to about 25 weight percent acid, and more preferably from about 18.5 to about 21.5 weight percent acid) and partially neutralized with sodium, manganese, lithium, potassium, zinc, magnesium calcium and nickel ions. The new cation neutralized high acid ionomers produce, when blended and melt processed according to the parameters set forth below, cover compositions exhibiting enhanced coefficient of restitution values when compared to low acid ionomers, or blends of low acid ionomer resins containing 16 weight percent acid or less. The new high acid ionomer cover compositions produce golf balls which exhibit properties of enhanced carrying distance (i.e. possess higher coefficient of restitution values) over known ionomer blends such as those set forth in U.S. Pat. Nos. 4,884,814 and 4,911,451, without sacrificing desirable characteristics such as playability and/or durability.

Along this line, until relatively recently, all of the ionomer resins commercially available contained at most 15 to 16 weight percent carboxylic acid. In 1989, DuPont introduced a number of new high acid ionomers and suggested that these new ionomers may have some use in previously known low acid ionomer applications such as the production of shoe soles, box toes, bowling pins, golf balls, ski boots, auto trim, etc.

Furthermore, DuPont suggested in a research disclosure (E. I. DuPont de Nemours & Co., Research Disclosure No. 297,003) that ionomers produced from polymers of ethylene acrylic acid or methacrylic acid containing greater than 15 weight percent acid can be melt processed to produce articles (i.e. golf balls, foot wear, ski boots, cosmetic bottle cap closures and so on) with good properties (i.e. improved stiffness, hardness and clarity) when compared with ionomers with lower acid levels.

However, not only has little information been provided concerning the acid levels and types of effective ionomers, particularly with respect to the art of golf ball manufacturing, it has been found that many cover compositions produced from polymers of ethylene/acrylic acid or ethylene/methacrylic acid containing greater than 15 weight percent acid have been dissatisfactory in that these compositions exhibit processing problems or are generally short on distance and/or durability and thus, are not particularly commercially viable. Similar poor results have been produced with covers composed of blends of high and low acid ethylene/acrylic acid or ethylene/methacrylic acid polymers and/or covers produced from single high acid ionomers.

However, notwithstanding the above difficulties, it has been discovered that improved golf ball covers can be produced from specific blends of high acid ionomers (i.e. ionomer resins containing greater than 16 weight percent acid, preferably from about 17 to about 25 weight percent acid, and more preferably from about 18.5 to about 21.5 weight percent acid) which do not exhibit the processing, distance and/or durability limitations demonstrated by the prior art.

In this regard, it has been found that blends of specific high acid ionomer resins, particularly blends of sodium and zinc high acid ionomers, as well as blends of sodium and magnesium high acid ionomers, extend, when utilized in golf ball cover construction, the range of hardness beyond that previously obtainable while maintaining the beneficial properties (i.e. durability, click, feel, etc.) of the softer low acid ionomers disclosed in U.S. Pat. Nos. 4,884,814 and 4,911,451. These blends produce harder, stiffer golf balls having higher C.O.R.s, and thus longer distance. This discovery is the subject matter of U.S. application Ser. No. 776,803, filed on Oct. 15, 1991, and currently copending herewith.

The present invention is directed to the development of a number of new high acid ionomers, particularly new metal cation neutralized acrylic acid based high acid ionomer resins, which exhibit, when utilized for golf ball cover construction, cover compositions having further improved hardness and resilience (C.O.R.) properties. The new metal cation neutralized acrylic acid based high acid ionomer resins, as well as specific blends of these resins, are particularly valuable in the field of golf ball production.

Furthermore, as a result of the development of a number of new acrylic acid based high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that many of these new cation neutralized high acid ionomer blends produce cover compositions exhibiting enhanced resilience (i.e. longer distance) due to synergies which occur during processing. Consequently, the new metal cation neutralized acrylic acid based high acid ionomer resins of the present invention may be blended to produce substantially harder golf balls having higher C.O.R.'s than those produced by the low acid ionomer covers presently commercially available.

These and other objects and features of the invention will be apparent from the following description and from the claims.

SUMMARY OF THE INVENTION

In one aspect, the present invention is directed to new metal cation neutralized high acid ionomer resins comprising a copolymer of greater than 16% by weight of an alpha, beta-unsaturated carboxylic acid (preferably from about 17% to about 25% by weight acid, and more preferably from about 18.5% to about 21.5% by weight acid) and an alpha-olefin, of which about 10% to about 90% of the carboxyl groups of the copolymer are neutralized with a metal cation selected from the group consisting of manganese, lithium, potassium, calcium and nickel.

In another aspect, the invention relates to metal cation neutralized high acid ionomer resins comprising a copolymer of about 20% by weight of an alpha, beta-unsaturated carboxylic acid (preferably acrylic acid) and an olefin (preferably ethylene), of which about 10% to about 90% of the carboxyl groups of the copolymer are neutralized with a metal cation selected from the group consisting of manganese, lithium, potassium, calcium and nickel.

In a further aspect, the present invention concerns a metal cation neutralized high acid ionomer resins comprising a copolymer of about 20% by weight acrylic acid with the remainder, or balance, thereof being ethylene, of which 10% to 90% of the carboxyl groups of the copolymer are neutralized with a metal cation selected from the group consisting of manganese, lithium, potassium, magnesium, calcium and nickel.

In still another aspect, the invention is directed to a metal cation neutralized high acid ionomer resin comprising a copolymer of about 20% by weight acrylic acid and the remainder ethylene, of which 10% to 90% of the carboxyl groups of the copolymer are neutralized with a metal cation selected from the group consisting of sodium, manganese, lithium, potassium, zinc, magnesium, calcium and nickel. The metal cation neutralized high acid ionomer resin produces, when blended and molded around solid or wound cores to form a cover composition, golf balls exhibiting enhanced resilience (i.e. improved C.O.R.) without adversely affecting the ball's playability and/or durability characteristics.

In an additional aspect, the invention relates to a method for producing metal cation neutralized high acid ionomer resins comprising the steps of providing a copolymer comprised of greater than 16% by weight of an alpha, beta-unsaturated carboxylic acid and an olefin; and neutralizing from about 10% to about 90% of the carboxylic acid groups of the copolymer with a metal cation selected from the group consisting of manganese, lithium, potassium, calcium and nickel. The metal cation neutralized high acid ionomer resins produced by this method are also provided.

In another aspect, the present invention concerns a process for producing metal cation neutralized acrylic acid based high acid ionomer resins comprising the steps of providing a copolymer made of about 20% by weight of acrylic acid and the balance ethylene, and neutralizing from about 10% to about 90% of the carboxylic acid groups of the copolymer with a metal cation selected from the group consisting of manganese, lithium, potassium, magnesium, calcium and nickel. The new metal cation neutralized high acid ionomer resins produced by this method are also provided.

In still a further aspect, the invention is directed to a golf ball comprising a core and a cover, wherein the cover is comprised of a metal cation neutralized high acid ionomer resin which is a copolymer of greater than 16% by weight of an alpha, beta-unsaturated carboxylic acid, (preferably from about 17% to about 25% by weight acid, and more preferably from about 18.5% to about 21.5% by weight acid) and an olefin, of which 10% to 90% of the carboxyl groups of the copolymer are neutralized with a metal cation selected from the group consisting of manganese, lithium, potassium, calcium and nickel. In addition, the cover may contain of one or more additional ingredients such as pigments, dyes, U.V. absorbers and optical brighteners.

In another further aspect, the invention relates to a golf ball comprising a core and a cover, wherein the cover is comprised of a metal cation neutralized ionomer resin which is a copolymer of about 20% by weight of an acrylic acid and the remainder ethylene, of which 10% to 90% of the carboxyl groups of the acrylic acid/ethylene copolymer are neutralized with a metal cation selected from the group consisting of manganese, lithium, potassium, magnesium, calcium and nickel. The core is generally a solid core, and additional ingredients such as pigments, dyes, U.V. absorbers and optical brighteners may be included in the cover.

In a further additional aspect, the invention is directed to a golf ball comprising a core and a cover, wherein the cover is a blend of two or more metal cation neutralized high acid ionomer resins, each ionomer resin comprised of about 20% by weight of acrylic acid and the remainder ethylene, of which about 10% to about 90% of the carboxyl groups of the copolymer are neutralized with a metal cation. The metal cation of each resin is a cation selected from the group consisting of sodium, manganese, lithium, potassium, zinc, magnesium, calcium and nickel. In this regard, diblends consisting of sodium/manganese, sodium/lithium, sodium/ zinc, sodium/magnesium, sodium/calcium, manganese/ potassium, lithium/zinc, lithium/magnesium, lithium/ calcium, and potassium/magnesium neutralized 20% acrylic acid/ethylene ionomer resins and triblends consisting of zinc/lithium/potassium, sodium/zinc/lithium, sodium/ manganese/calcium, sodium/potassium/manganese, and sodium/potassium/magnesium neutralized 20% acrylic acid/ ethylene ionomer resins are the more preferred blends which comprise the cover component of the invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE INVENTION

The present invention relates to the development of a number of new metal cation neutralized high acid ionomers. In addition, the present invention relates to the use of these new metal cation neutralized high acid ionomers, and/or blends thereof, for the purpose of producing golf ball covers exhibiting enhanced resilience and/or hardness characteristics.

In this regard, several new metal cation neutralized high acid ionomer resins have been produced by neutralizing, to various extents, high acid copolymers of an alpha-olefin and an alpha, beta-unsaturated carboxylic acid with a wide variety of different metal cation salts. More particularly, it has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use in the invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 1.

carboxylic acid groups in the high acid copolymer. The extent of neutralization is generally from about 10% to about 90%.

As indicated more specifically in Example 1 below, a number of new types of metal cation neutralized high acid ionomers can be obtained from the process of this invention. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium,

TABLE 1

Typical Properties of Primacor Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM | | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins of the invention are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 100 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the lithium, zinc, magnesium, manganese, calcium and nickel, several new cation neutralized acrylic acid based high acid ionomer resins are produced.

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field golf ball manufacturing.

When utilized in golf ball cover construction, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, and the recently produced high acid blends disclosed in U.S. application Ser. No. 776,803.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for golf ball production. By using the high acid ionomer resins of the present invention, harder, stiffer golf balls having higher C.O.R.s, and thus longer distance, can be obtained.

Examples of existing high acid methacrylic acid based ionomers include Surlyn® AD-8422 (sodium cation), Surlyn® 8162 (zinc cation), Surlyn® SEP-503-1 (an experimental zinc cation), and Surlyn® SEP-503-2 (an experimental magnesium cation). According to DuPont, all of these ionomers contain from about 18.5% to about 21.5% by weight methacrylic acid.

More particularly, Surlyn® AD-8422, is currently commercially available from DuPont in a number of different grades (i.e. AD-8422-2, AD-8422-3, AD-8422-5, etc.) based upon differences in melt index. According to DuPont, Surlyn® AD-8422 offers the following general properties when compared to Surlyn® 8920 the stiffest, hardest of all of the low acid grades (referred to as "hard" ionomers in U.S. Pat. No. 4,884,814):

TABLE 2

|  | LOW ACID (15 wt % Acid) | HIGH ACID (>20 wt % Acid) | |
| --- | --- | --- | --- |
|  | SURLYN® 8920 | SURLYN® 8422-2 | SURLYN® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| $MP^1$, °C. | 88 | 86 | 85 |
| $FP^1$, °C. | 47 | 48.5 | 45 |
| COMPRESSION MOLDING$^2$ |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

$^1$DSC second heat, 10° C./min heating rate.
$^2$Samples compression molded at 150° C. annealed 24 hours at 60° C. 8422-2, 8422-3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (an experimental zinc cation neutralized high acid methacrylic acid based ionomer resin) and Surlyn® SEP-503-2 (an experimental magnesium cation neutralized high acid methacrylic acid based ionomer resin) are high acid zinc and magnesium versions of the Surlyn® AD 8422 high acid ionomers. When compared to the Surlyn® AD 8422 high acid ionomers, the Surlyn® SEP-503-1 and SEP-503-2 ionomers can be defined as follows:

TABLE 3

| Surlyn® Ionomer | Ion | Melt Index | Neutralization % |
| --- | --- | --- | --- |
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation neutralized methacrylic acid based high acid ionomer resin containing approximately 20% by weight (i.e. 18.5–21.5% weight) methacrylic acid copolymer that has been 30–70% neutralized. Surlyn® 8162 is currently commercially available from DuPont.

For comparison purposes, examples of commercially available low acid methacrylic acid based ionomer resins are set forth below. These are many of the "hard" ionomers utilized in the cover composition disclosed in U.S. Pat. No. 4,884,814. Along this line, the low acid ionomer resin cover compositions disclosed in the '814 patent are generally considered to be among the best prior art methacrylic acid based cover compositions currently available from Spalding & Evenflo Companies, Inc., the assignee of the present application and U.S. application Ser. No. 776,803.

TABLE 4

|  | ASTM D | 8940 | 9910 | 8920 |
| --- | --- | --- | --- | --- |
| Cation Type |  | Sodium | Zinc | Sodium |
| Melt flow index, gms/10 min | D-1238 | 2.8 | 0.7 | 0.9 |
| Specific Gravity, g/cm$^3$ | D-792 | 0.95 | 0.97 | 0.95 |
| Hardness, Shore D | D-2240 | 66 | 64 | 66 |
| Tensile Strength, (kpsi), MPa | D-638 | (4.8) 33.1 | (3.6) 24.8 | (5.4) 37.2 |
| Elongation, % | D-638 | 470 | 290 | 350 |
| Flexural Modulus, (kpsi) MPa | D-790 | (51) 350 | (48) 330 | (55) 380 |
| Tensile Impact (23° C.) KJ/m$_2$ (ft.-lbs./in$^2$) | D-18225 | 1020 (485) | 1020 (485) | 865 (410) |
| Vicat Temperature, °C. | D-1525 | 63 | 62 | 58 |
| % Weight Methacrylic acid (MAA) |  | 15 | 15 | 15 |
| % of Acid Groups Cation Neutralized |  | 29 | 58 | 59 |

|  | ASTM D | 8528 | 9970 | 9730 |
| --- | --- | --- | --- | --- |
| Cation Type |  | Sodium | Zinc | Zinc |
| Melt flow index, gms/10 min | D-1238 | 1.3 | 14.0 | 1.6 |
| Specific Gravity, g/cm$^3$ | D-792 | 0.94 | 0.95 | 0.95 |
| Hardness, Shore D | D-2240 | 60 | 62 | 63 |
| Tensile Strength, (kpsi), MPa | D-638 | (4.2) 29.0 | (3.2) 22.0 | (4.1) 28.0 |
| Elongation, % | D-638 | 450 | 460 | 460 |
| Flexural Modulus, (kpsi) MPa | D-790 | (32) 220 | (28) 190 | (30) 210 |
| Tensile Impact (23° C.) KJ/m$_2$ (ft.-lbs./in$^2$) | D-18225 | 1160 (550) | 760 (360) | 1240 (590) |
| Vicat Temperature, °C. | D-1525 | 73 | 61 | 73 |
| % Weight Methacrylic acid (MAA) |  | 10 | 15 | 12 |
| % of Acid Groups Cation Neutralized |  | 54 | 22 | 38 |

Examples of existing high acid acrylic acid based ionomer resins include the Escor® or the Iotek acrylic acid based high acid ionomers recently experimentally produced by Exxon. In this regard, Escor®, or Iotek, 959 is a sodium ion neutralized ethylene-acrylic acid copolymer and Escor®, or Iotek, 960 is a zinc neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions respectfully. The physical properties of these high acid acrylic acid based ionomers are as follows:

TABLE 5

| PROPERTY | ESCOR® (IOTEK) 959 | ESCOR® (IOTEK) 960 |
| --- | --- | --- |
| Melt Index, g/10 min | 2.0 | 1.8 |
| Cation | Sodium | Zinc |
| Melting Point, °F. | 172 | 174 |
| Vicat Softening Point, °F. | 130 | 131 |
| TenBile @ Break, psi | 4600 | 3500 |
| Elongation @ Break, % | 325 | 430 |
| Hardness, Shore D | 66 | 57 |
| Flexural Modulus, psi | 66,000 | 27,000 |

For comparison purposes, examples of commercially available low acid acrylic acid based ionomer resins, such as these utilized in U.S. Pat. No. 4,911,451 are set forth below.

TABLE 6

Typical Properties of Low Acid Escor ® (Iotek) Ionomers

| Resin Properties | ASTM Method | Units | 4000 | 4010 | 8000 | 8020 |
|---|---|---|---|---|---|---|
| Cation type | | | zinc | zinc | sodium | sodium |
| Melt index | D-1238 | g/10 min. | 2.5 | 1.5 | 0.8 | 1.6 |
| Density | D-1505 | kg/m³ | 963 | 963 | 954 | 960 |
| Melting Point | D-3417 | ° C. | 90 | 90 | 90 | 87.5 |
| Crystallization Point | D-3417 | ° C. | 62 | 64 | 56 | 53 |
| Vicat Softening Point | D-1525 | ° C. | 62 | 63 | 61 | 64 |
| % Weight Acrylic Acid | | | 16 | — | 11 | — |
| % of Acid Groups Cation Neutralized | | | 30 | — | 40 | — |

| Plaque Properties (3 mm thick, compression molded) | ASTM Method | Units | 4000 | 4010 | 8000 | 8020 |
|---|---|---|---|---|---|---|
| Tensile at Break | D-638 | MPa | 24 | 26 | 36 | 31.5 |
| Yield point | D-638 | MPa | none | none | 21 | 21 |
| Elongation at break | D-638 | % | 395 | 420 | 350 | 410 |
| 1% Secant modulus | D-638 | MPa | 160 | 160 | 300 | 350 |
| Shore Hardness D | D-2240 | — | 55 | 55 | 61 | 58 |

| Resin Properties | ASTM Method | Units | 8030 | 7010 | 7020 | 7030 |
|---|---|---|---|---|---|---|
| Cation type | | | sodium | zinc | zinc | zinc |
| Melt index | D-1238 | g/10 min. | 2.8 | 0.8 | 1.5 | 2.5 |
| Density | D-1505 | kg/m³ | 960 | 960 | 960 | 960 |
| Melting Point | D-3417 | ° C. | 87.5 | 90 | 90 | 90 |
| Crystallization Point | D-3417 | ° C. | 55 | — | — | — |
| Vicat Softening Point | D-1525 | ° C. | 67 | 60 | 63 | 62.5 |
| % Weight Acrylic Acid | | | — | — | — | — |
| % of Acid Groups Cation Neutralized | | | — | — | — | — |

| Plaque Properties (3 mm thick, compression molded) | ASTM Method | Units | 8030 | 7010 | 7020 | 7030 |
|---|---|---|---|---|---|---|
| Tensile at Break | D-638 | MPa | 28 | 38 | 38 | 38 |
| Yield point | D-638 | MPa | 23 | none | none | none |
| Elongation at break | D-638 | % | 395 | 500 | 420 | 395 |
| 1% Secant modulus | D-638 | MPa | 390 | — | — | — |
| Shore Hardness D | D-2240 | — | 59 | 57 | 55 | 55 |

According to the present invention, it has been found that when the above indicated new metal cation neutralized acrylic acid based high acid ionomers, are processed according to the parameters set forth below to produce the covers of multi-layered golf balls, the resulting golf balls will travel further than previously known low acid ionomer resin covers and/or covers produced from high acid ionomers and/or high acid/low acid ionomer blends due to the balls' enhanced coefficient of restitution values. This is particularly important in that an improvement of 0.001 in C.O.R. generally relates to our improvement of about 0.2 to 0.5 yards in travel distance. In addition, the resulting golf balls maintain the playability and durability characteristics exhibited by known low-acid ionomer resin covered balls.

When blends of two of the above indicated metal cation neutralized acrylic acid high acid ionomers are used (i.e. "dibends"), the ratio of one type of metal cation neutralized acrylic acid high acid ionomer to another is generally from about 75% to about 25% and from about 25% to about 75%. In addition, "triblends" can also be formulated utilizing the new metal cation neutralized acrylic acid based high acid ionomers of the present invention. The general ratio for such "triblends" is 33.33%/33.33%/33.33% by weight.

Additional compatible additive materials may also be added to the compositions of the present invention, such as dyes (for example, Ultramarine Blue sold by Whitaker, Clark, and Daniels of South Painsfield, N.J.), and pigments, i.e. white pigments such as titanium dioxide (for example Unitane 0-110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since these are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardaley, N.Y. Uvitex OB is thought to be 2,5-Bis (5-tert-butyl-2-benzoxazoly) thiopene. Examples of other optical brighteners suitable for use in accordance with this invention are as follows: Leucopure EGM as sold by Sandoz, East Hanover, N.J. 07936. Leucopure EGM is thought to be 7-(2h-naphthol(1,2-d)-triazol-2yl)-3phenyl-coumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis(-benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The cover compositions of the present invention may be produced according to conventional melt blending procedures. In this regard, the above indicated high acid ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 inches or greater and weighing about 1.620 ounces. The standards for both the diameter and weight of the balls are established by the United States Golf Association (U.S.G.A.). Although both solid core and wound cores can be utilized in the present invention, as a result of their lower cost and superior performance, solid molded cores are preferred over wound cores.

Conventional solid cores are typically compression molded from a slug of uncured or lightly cured elastomer composition comprising a high cis content polybutadiene and a metal salt of an $\alpha$, $\beta$, ethylenically unsaturated carboxylic acid such as zinc mono or diacrylate or methacrylate. To achieve higher coefficients of restitution in the core, the manufacturer may include a small amount of a metal oxide such as zinc oxide. In addition, larger amounts of metal oxide than those that are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solid layer beneath the cover and above the core as in U.S. Pat. No. 4,431,193, and other multilayer and/or non-wound cores (such as those described in U.S. Pat. No. 4,848,770).

Wound cores are generally produced by winding a very large elastic thread around a solid or liquid filled balloon center. The elastic thread is wound around the center to produce a finished core of about 1.4 to 1.6 inches in diameter, generally. Since the core material is not an integral part of the present invention, a detailed discussion concerning the specific types of core materials which may be utilized with the cover compositions of the invention are not specifically set forth herein. In this regard, the cover compositions of the invention may be used in conjunction with any standard golf ball core.

As indicated, the golf balls of the present invention may be produced by forming covers consisting of the compositions of the invention around cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911,451.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLES

By blending the ingredients set forth in the Tables below, a series of new metal cation neutralized high acid ionomer resins and golf ball cover formulations containing these resins were produced. Finished golf balls were prepared using the cover compositions of the present invention, controls and comparative cover compositions by positioning a solid preformed cross-linked polybutadiene core in an injection molding cavity in such a manner to permit the uniform injection of the selected cover composition over each core. Along this line, the cover formulations were injection molded at about 400° F. around identical solid type cores having a finished diameter of 1.545 inches to produce golf balls approximately 1.680 inches in diameter having a normal cover thickness of 0.0675 inches. All materials were molded under essentially identical conditions. The properties of coefficient of restitution (C.O.R.) of the molded and finished balls, Shore D hardness, cold crack resistance, spin rates, etc. for the cover compositions were then determined.

In conducting the comparative prior art testing, Escor® 4000/7030 and Escor® 900/8000 ionomers were utilized. In this regard, blends of Escor® 4000/7030 and Escor® 900/8000 (i.e. the subject of U.S. Pat. No. 4,911,451) are considered by the inventors to be generally among the best prior art cover compositions concerning ethylene-acrylic acid ionomer (low acid) blends.

The data for each example represents the average data for one dozen balls produced according to the desired manner. The properties were measured according to the following parameters:

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test D-2240.

Cold cracking resistance was measured by firing balls from an air cannon, 5 blows at 165 feet/sec, after the balls had been conditioned for 24 hours at −10° F. After allowing the balls to equilibrate to room temperature the balls are inspected for cover cracking.

The spin rate of the golf ball was measured by striking the resulting golf balls with a pitching wedge or 9-iron wherein the club-head speed is about 80 feet per second and the ball is launched at an angle of 26 to 34 degrees with an initial velocity of about 110–115 feet per second. The spin rate was measured by observing the rotation of the ball in flight using stop action Strobe photography.

Example 1
Preparation of Acrylic Acid Based High Acid Ionomers

A number of new cation neutralized acrylic acid based high acid ionomer resins were prepared utilizing as the copolymer of an olefin and an alpha, beta-unsaturated carboxylic acid, a 20 weight percent acrylic acid/ethylene copolymer produced by The Dow Chemical Company, Midland, Mich. under the designation "Primacor 5981." According to The Dow Chemical Company, Primacor 5981 has a melt index (at 190° C., 2150 g) of 300 g/10 min. The carboxylic acid groups present in the 20 weight percent acrylic acid/ethylene copolymer were neutralized to various weight percentages by a number of different metal cation salts resulting in the production of several new thermoplastic elastomers exhibiting enhanced properties for golf ball cover production. Due to differences in the nature of the cation salts, the amount of cation salts utilized, etc., the new high acid ionomer resins produced differed substantially in the extent of neutralization and in melt indices, as well as in resilience (i.e. C.O.R.) and hardness values.

For the purpose of determining the weight percent of neutralization of the carboxylic acid groups in the acrylic acid/ethylene copolymer after reacting with various cation salts, it was assumed that 1 mole of sodium ($Na^+$), potassium ($K^+$), and lithium ($Li^+$) neutralized one mole of acrylic acid, and that one mole of zinc ($Zn^{2+}$), magnesium ($Mg^{2+}$), manganese ($Mn^{2+}$), calcium ($Ca^{2+}$) and nickel ($Ni^{2+}$) neutralized two moles of acrylic acid. The calculations of neutralization were based upon an acrylic acid molecular weight of 79 g/m, giving 0.2778 moles per 100 grams of copolymer.

As indicated below in Table 7, the various cation salts were added in variable amounts to the 20 weight percent acrylic acid/ethylene copolymer in order to determine the optimal level of neutralization for each of the cations. In Table 7, NaOH refers to sodium hydroxide (formula weight of 40). MnAc refers to manganese acetate tetrahydrate having a formula weight of 245. LiOH is lithium hydroxide, fwt=24. KOH is potassium hydroxide, fwt=56. ZnAc is zinc acetate dihydrate, fwt=219.5. MgAc is magnesium acetate tetrahydrate, fwt=214.4. CaAc is calcium acetate, fwt=158. MgO is magnesium oxide, fwt=40.3. NiAc is nickel acetate, fwt=176.8. All of these cation salts are solids at room temperature.

The specific cation salts were added in differing amounts with the 20 weight percent acrylic acid/ethylene copolymer (i.e. the Primacor 5981) to an internal mixer (Banbury type) for the neutralization reaction. The only exception was calcium acetate, which, due to problems encountered in solid form, was added as a 30 wt-% solution in water.

In the neutralization reaction, the cation salts solubilized in the Primacor 5981 acrylic acid/ethylene copolymer above the melting point of the copolymer and a vigorous reaction took place with a great deal of foaming occurring as the cation reacted with the carboxylic acid groups of the acrylic acid/ethylene copolymer and the volatile by-products of water (in the case of oxides or hydroxides) or acetic acid (when acetates are used) were evaporated. The reaction was continued until foaming ceased (i.e. about 30–45 minutes at 250–350° F.), and the batch was removed from the Banbury mixer. Mixing continued of the batch obtained from the mixer on a hot two-roll mill (175–250° F.) to complete the neutralization reaction. The extent of the reaction was monitored by measuring melt flow index according to ASTM D-1238-E. As indicated below, the neutralized products exhibited drastically different properties depending upon the nature and amount of the cation salts utilized.

TABLE 7

| Formulation No. | wt-% Cation Salt | wt-% Neutralization | Melt Index | C.O.R. | Shore D Hardness |
| --- | --- | --- | --- | --- | --- |
| 1 (NaOH) | 6.98 | 67.5 | 0.9 | .804 | 71 |
| 2 (NaOH) | 5.66 | 54.0 | 2.4 | .808 | 73 |
| 3 (NaOH) | 3.84 | 35.9 | 12.2 | .812 | 69 |
| 4 (NaOH) | 2.91 | 27.0 | 17.5 | .812 | (brittle) |
| 5 (MnAc) | 19.6 | 71.7 | 7.5 | .809 | 73 |
| 6 (MnAc) | 23.1 | 88.3 | 3.5 | .814 | 77 |
| 7 (MnAc) | 15.3 | 53.0 | 7.5 | .810 | 72 |
| 8 (MnAc) | 26.5 | 106 | 0.7 | .813 | (brittle) |
| 9 (LiOH) | 4.54 | 71.3 | 0.6 | .810 | 74 |
| 10 (LiOH) | 3.38 | 52.5 | 4.2 | .818 | 72 |
| 11 (LiOH) | 2.34 | 35.9 | 18.6 | .815 | 72 |
| 12 (KOH) | 5.30 | 36.0 | 19.3 | Broke | 70 |
| 13 (KOH) | 8.26 | 57.9 | 7.18 | .804 | 70 |
| 14 (KOH) | 10.7 | 77.0 | 4.3 | .801 | 67 |
| 15 (ZnAc) | 17.9 | 71.5 | 0.2 | .806 | 71 |
| 16 (ZnAc) | 13.9 | 53.0 | 0.9 | .797 | 69 |
| 17 (ZnAc) | 9.91 | 36.1 | 3.4 | .793 | 67 |
| 18 (MgAc) | 17.4 | 70.7 | 2.8 | .814 | 74 |
| 19 (MgAc) | 20.6 | 87.1 | 1.5 | .815 | 76 |
| 20 (MgAc) | 13.8 | 53.8 | 4.1 | .814 | 74 |
| 21 (CaAc) | 13.2 | 69.2 | 1.1 | .813 | 74 |
| 22 (CaAc) | 7.12 | 34.9 | 10.1 | .808 | 70 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness

| Formulation No. | Wt-% Cation Salt | Wt-% Neutralization | Melt Index | C.O.R. |
| --- | --- | --- | --- | --- |
| 23 (MgO) | 2.91 | 53.5 | 2.5 | .813 |
| 24 (MgO) | 3.85 | 71.5 | 2.8 | .808 |
| 25 (MgO) | 4.76 | 89.3 | 1.1 | .809 |
| 26 (MgO) | 1.96 | 35.7 | 7.5 | .815 |

Control for Formulations 23–26 is 50/50 Iotek 8000/7030,
C.O.R. = .814, Formulation 26 C.O.R. was normalized to that control accordingly

| Formulation No. | Wt-% Cation Salt | Wt-% Neutralization | Melt Index | C.O.R. | Shore D Hardness |
| --- | --- | --- | --- | --- | --- |
| 27 (NiAc) | 13.04 | 61.1 | 0.2 | .802 | 71 |
| 28 (NiAc) | 10.71 | 48.9 | 0.5 | .799 | 72 |
| 29 (NiAc) | 8.26 | 36.7 | 1.8 | .796 | 69 |
| 30 (NiAc) | 5.66 | 24.4 | 7.5 | .786 | 64 |

Control for Formulation Nos. 27–30 is 50/50 Iotek 8000/7030,
C.O.R. = .807

As indicated in Table 7, a number of the new cation neutralized acrylic acid based high acid ionomer resins exhibited C.O.R. and Shore D hardness values greater than that exhibited by a 50/50 blend of the Iotek low acid acrylic acid based hard ionomer resins, such as the Iotek 8000/7030 blend utilized in the cover compositions disclosed in U.S. Pat. No. 4,911,451. Moreover, included in new acrylic acid based high acid ionomer resins were numerous cation neutralized high acid ionomer resins previously not available, such as those acrylic acid based high acid ionomer resins neutralized to various degrees by the manganese, lithium, potassium, magnesium, calcium and nickel salts. Furthermore, the new cation neutralized acrylic acid based high acid ionomers produced C.O.R. and hardness values greater than those shown by the methacrylic acid based high acid ionomer resins recently produced by DuPont (i.e. Surlyn® 8422 (Na) and Surlyn® 8162 (Zn)) and the acrylic acid based high acid resins experimentally produced by Exxon (i.e. Iotek EX-959 and Ex-960 (Zn)), collectively referred to as "the controls."

In addition, the results produced by Formulation Nos. 1 through 3 directed to the sodium ion neutralized ethylene-acrylic acid copolymers and Formulation Nos. 15 through 17 directed to the zinc ion neutralized ethylene-acrylic acid copolymers in comparison to the new Iotek high acid ethylene acrylic acid ionomers were also of interest. As indicated above, Escor® or Iotek Ex-959 is a sodium ion neutralized ethylene-acrylic acid copolymer and Escor® or Iotek Ex-960 is a zinc neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectfully.

Formulation No. 2 (i.e. 5.66 wt-% sodium salt, 54 wt-% neutralization, 2.4 melt index, 0.808 C.O.R. and 73 Shore D hardness) is somewhat similar to Iotek 959 and Formulation No. 16 (i.e. 13.9 wt-% zinc salt, 53 wt-% neutralization, 0.9 melt index, 0.797 C.O.R. and 69 Shore D hardness) is somewhat similar to Iotek 960.

However, not only did the new cation neutralized acrylic acid based high acid ionomers of the present invention exhibit similar or better resilience (C.O.R.) at comparable or better hardness values than those exhibited by the sodium or zinc high acid Iotek ionomers, as a result of the neutralization of the acrylic acid/ethylene copolymer with several different cation salts, to a number of different neutralization percentages, a wide variety of new cation neutralized acrylic acid based high acid ionomers were produced having improved resilience and hardness values. These new cation neutralized high acid ionomer resins are particularly valuable in the field of golf ball production.

More particularly, the development of a number of separate different cation neutralized high acid ionomers besides the sodium or zinc high acid ionomers available from DuPont or Exxon, such as the new manganese, lithium, potassium, magnesium, calcium and nickel acrylic acid based high acid ionomer resins, allows for the production of a wide variety of cation neutralized high acid ionomer blends. Furthermore, since the new sodium or zinc neutralized high acid ionomers produced improved properties over those produced by the existing available sodium or zinc high acid ionomers, a number of new cover compositions can be produced having enhanced characteristics.

Along this line, several of the cation neutralized acrylic acid based high acid ionomer resins produced above which exhibited enhanced C.O.R. and Shore D hardness values were blended together and evaluated for the purpose of determining whether any synergistic effects were produced particularly with respect to enhanced C.O.R. values.

Specifically, from each group of the different cation neutralized high acid ionomer resins set forth in Table 7, the best overall ionomer (based upon C.O.R., melt index and Shore D hardness) was utilized to produce a number of blends ("diblends" and "triblends") and processed to produce the cover component of multi-layered golf balls. The "diblends" consisted of 50/50 mixtures and the "triblends" consisted of a 33.33/33.33/33.33 mixtures.

With respect to the blends set forth in Tables 8 and 9, Na refers to Formulation No. 3, C.O.R. (molded/finished) of 0.812/817; Mn refers to Formulation No. 6, C.O.R. (molded/finished) of 0.814/0.814; Li refers to Formulation No. 10, C.O.R. (molded/finished) of 0.818/0.819; K refers to Formulation No. 13, C.O.R. (molded/finished) of 0.805/0.809; Zn refers to Formulation No. 16, C.O.R. (molded/finished) of 0.797/0.796; Mg refers to Formulation No. 18, C.O.R. (molded/finished) of 0.814/0.820; Ca refers to Formulation No. 21, C.O.R. (molded/finished) of 0.813/0.812; Ni refers to Formulation No. 28, C.O.R. (molded/finished) of 0.799/0.817; and 50/50 Iotek 8000/7030 refers to control of 50/50 blend of Iotek 8000/7030, C.O.R. (molded/finished) of 0.810/0.812.

The C.O.R. values of the "diblends" and "triblends" were then evaluated after molding with a center stock having the following composition:

| MATERIAL | WEIGHT (phr) |
| --- | --- |
| BR-1220[1] | 70.70 |
| Taktene 220[2] | 29.30 |
| React Rite ZDA[3] | 31.14 |
| Zinc Oxide | 6.23 |
| Zinc Stearate | 20.15 |
| Limestone | 17.58 |
| Ground Flash (20–40 mesh) | 20.15 |
| Blue Masterbatch | .012 |
| Luperco 231XL[4] or Trigonox 29/40[5] | .89 |
| Papi 94[6] | .50 |

[1]BR-1220 is high cis-polybutadiene from Shell Chemical Co., Houston Texas.
[2]Taktene is high cis-polybutadiene from Polysar ChemicaL.
[3]ZDA is zinc diacrylate.
[4]Luperco 231XL is peroxide-free radical initiator manufactured and sold by Atochem, Buffalo, New York.
[5]Trigonox 29140 is peroxide-free radical initiator manufactured and sold by Akzo Chemie America, Chicago, Illinois.
[6]Papi 94 is a polymeric diisocyanate available from Dow Chemical Co., Midland, Michigan.

In addition, the molded balls were coated and finished according to the procedure mentioned above. The C.O.R. values of the finished balls were determined in order to evaluate whether any improvement in resilience was produced. Generally, it is typical to observe a 0.002 to 0.003 point pick up in C.O.R. values of the finished balls in comparison to the molded balls. The results are set forth in Tables 8A, 8B and 9 below.

TABLE 8A

Diblends (50/50 Blends) C.O.R. (Molded/Finished) Values

| Formulation No. | Blend | C.O.R. (Molded/Finished) |
| --- | --- | --- |
| 31 | Na/Mn | .813/.818 |
| 32 | Na/Li | .813/.818 |
| 33 | Na/K | .809/.816 |
| 34 | Na/Zn | .811/.818 |
| 35 | Na/Mg | .813/.819 |
| 36 | Na/Ca | .811/.819 |
| 37 | Mn/Li | .811/.817 |
| 38 | Mn/K | .811/.818 |
| 39 | Mn/Zn | .807/.814 |
| 40 | Mn/Mg | .809/.816 |
| 41 | Mn/Ca | .809/.816 |
| 42 | Li/K | .810/.817 |
| 43 | Li/Zn | .813/.819 |
| 44 | Li/Mg | .812/.820 |

TABLE 8A-continued

Diblends (50/50 Blends) C.O.R. (Molded/Finished) Values

| Formulation No. | Blend | C.O.R. (Molded/Finished) |
| --- | --- | --- |
| 45 | Li/Ca | .811/.818 |
| 46 | K/Zn | .810/.815 |
| 47 | K/Mg | .811/.820 |
| 48 | K/Ca | .810/.817 |
| 49 | Zn/Mg | .807/.814 |
| 50 | Zn/Ca | .808/.814 |
| 51 | Mg/Ca | .801/.818 |
| 52 | Na/Ni | .809/.815 |
| 53 | Mn/Ni | .807/.814 |
| 54 | Li/Ni | .809/.816 |
| 55 | K/Ni | .809/.816 |
| 56 | Zn/Ni | .799/.804 |
| 57 | Mg/Ni | .805/.813 |
| 58 | Ca/Ni | .807/.815 |
| 59 | Iotek 959/960 | .811/.818 |
| 60 | Control | .809/NA |
| 61 | Control | .806/NA |

Controls are Formulation No. 59, a 50/50 blend of Iotek 959/960; Formulation No. 60 a 75/25 blend of Surlyn 8162/8422; and Formulation No. 61 a 50/50 blend of Iotek 8000/7030.

FINAL (COR) exp=experimental finished COR for blend
FINAL (COR) diff=difference between FINAL (COR) exp and FINAL (COR) (calc)

As noted in Table 8B, positive synergy in resilience is observed for nearly all of the finished (final) blends, with substantial synergy being produced in Formulation Nos. 34, 38, 39, 43, 46, 48, 49, 50.

Moreover, the diblends were also evaluated against a control Formulation No. 59 (see Table 8A), a 50/50 blend of Iotek 959/960, the best available high acid blends, with respect to improved C.O.R. values (i.e. 811/0.818). Similar or enhanced C.O.R. values (molded/finished) were observed in Formulation Nos. 31 (Na/Mn), 32 (Na/Li), 34 (Na/Zn), 35 (Na/Mg), 36 (Na/Ca), 38 (Mn/K), 43 (Li/Zn), 44 (Li/Mg), 45 (Li/Ca), and 47 (K/Mg).

Furthermore, when reviewed for cold cracking, with the exception of Formulation No. 35, all of the diblends tested exhibited resistance to breaking. With respect to Formulation No. 35, some breakage did occur with 2 out of the 12 balls tested exhibiting breakage.

When the small test sample of the triblends were evaluated (see Table 9 below) in comparison to a 50/50 blends of the low acid acrylic acid based hard ionomers (i.e. Iotek 8000/7030 U.S. Pat. No. 4,911,451), all of the cation neutralized high acid acrylic acid based triblends produced enhanced C.O.R. values upon molding and finishing. In

TABLE 8B

Synergy Values of the DiBlends

| Formulation No. | Salt 1 | Salt 2 | (COR) calc | (COR) exp | (COR) exp-(COR) calc | Final (COR) calc | Final (COR) exp | Final (COR) Diff. |
| --- | --- | --- | --- | --- | --- | --- | --- | --- |
| 31 | Na | Mn | 813.0 | 813.0 | 0.0 | 815.5 | 818.0 | 2.5 |
| 32 | Na | Li | 815.0 | 813.0 | −2.0 | 818.0 | 818.0 | 0.0 |
| 33 | Na | K | 808.0 | 809.0 | 1.0 | 813.0 | 816.0 | 3.0 |
| 34 | Na | Zn | 804.5 | 811.0 | 6.5 | 806.5 | 818.0 | 11.5 |
| 35 | Na | Mg | 813.0 | 813.0 | 0.0 | 818.5 | 819.0 | 0.5 |
| 36 | Na | Ca | 812.5 | 811.0 | −1.5 | 814.5 | 819.0 | 4.5 |
| 37 | Mn | Li | 816.0 | 811.0 | −5.0 | 816.5 | 817.0 | 0.5 |
| 38 | Mn | K | 809.0 | 811.0 | 2.0 | 811.5 | 818.0 | 6.5 |
| 39 | Mn | Zn | 805.5 | 807.0 | 1.5 | 805.0 | 814.0 | 9.0 |
| 40 | Mn | Mg | 814.0 | 809.0 | −5.0 | 817.0 | 816.0 | −1.0 |
| 41 | Mn | Ca | 813.5 | 809.0 | −4.5 | 813.0 | 816.0 | 3.0 |
| 42 | Li | K | 811.0 | 810.0 | −1.0 | 814.0 | 817.0 | 3.0 |
| 43 | Li | Zn | 807.5 | 813.0 | 5.5 | 807.5 | 819.0 | 11.5 |
| 44 | Li | Mg | 816.0 | 812.0 | −4.0 | 819.5 | 820.0 | 0.5 |
| 45 | Li | Ca | 815.5 | 811.0 | −4.5 | 815.5 | 818.0 | 2.5 |
| 46 | K | Zn | 800.5 | 810.0 | 9.5 | 802.5 | 815.0 | 12.5 |
| 47 | K | Mg | 809.0 | 811.0 | 2.0 | 814.5 | 820.0 | 5.5 |
| 48 | K | Ca | 806.0 | 810.0 | 4.0 | 810.5 | 817.0 | 6.5 |
| 49 | Zn | Mg | 805.5 | 807.0 | 1.5 | 808.0 | 814.0 | 6.0 |
| 50 | Zn | Ca | 805.0 | 808.0 | 3.0 | 804.0 | 814.0 | 10.0 |
| 51 | Mg | Ca | 813.5 | 810.0 | −3.5 | 816.0 | 818.0 | 2.0 |
| 52 | Na | Ni | 805.5 | 809.0 | 3.5 | 817.0 | 815.0 | −2.0 |
| 53 | Mn | Ni | 806.5 | 807.0 | 0.5 | 815.5 | 814.0 | −1.5 |
| 54 | Li | Ni | 808.5 | 809.0 | 0.5 | 818.0 | 816.0 | −2.0 |
| 55 | K | Ni | 801.5 | 809.0 | 7.5 | 813.0 | 816.0 | 3.0 |
| 56 | Zn | Ni | 798.0 | 799.0 | 1.0 | 806.5 | 804.0 | −2.5 |
| 57 | Mg | Ni | 806.5 | 805.0 | −1.5 | 818.5 | 813.0 | −5.5 |
| 58 | Ca | Ni | 806.0 | 807.0 | 1.0 | 814.5 | 815.0 | 0.5 |

In Table 8B above, the C.O.R. synergy values are based upon the data from Table 7 of the various metal cation neutralized high acid acrylic acid based ionomer resins and the following calculations:

(COR) calc=coefficient calculated as weighted average of as-molded COR's for polymers of salts 1 and 2

(COR) exp=experimental as-molded COR for blend

FINAL (COR)calc=coefficient calculated as weighted average of finished COR's for polymers of salts 1 and 2 addition, when subjected to cold cracking, no breakages were observed.

TABLE 9

| Formulation | Cation Blend | C.O.R. Molded | C.O.R. Finished Ball |
| --- | --- | --- | --- |
| 62 | Zn/Li/K | .819 | .828 |
| 63 | Na/Zn/Li | .821 | .829 |

TABLE 9-continued

| Formulation | Cation Blend | C.O.R. Molded | C.O.R. Finished Ball |
|---|---|---|---|
| 64 | Iotek 8000/7030 | .816 | .819 |
| 65 | Na/Mn/Ca | .820 | .828 |
| 66 | Na/K/Nn | .821 | .829 |
| 67 | Na/K/Mg | .821 | .829 |

Consequently, not only are a number of new cation neutralized acrylic acid based high acid ionomers now available for golf ball cover construction, these new cation neutralized acrylic acid based high acid ionomers may be blended together in various combinations to produce cover compositions exhibiting enhanced resilience (i.e. distance) due to the synergies noted above.

Example 2

In order to determine whether the diblends or triblends of the new cation neutralized acrylic acid based high acid ionomer resins produced different results when dry blended (i.e. prepared as simple dry blends of pre-made single cation neutralized acrylic acid based high acid ionomers, such as those set forth in Example 1 above) or when produced as "in-situ" cation blends (i.e. the cations were first blended and then added to the acrylic acid/ethylene copolymers in the Banbury mixer), a number of comparison reactions were generated. Specifically, in-situ Formulation Nos. 68–72 in Table 10 below correspond to dry-blended Formulation Nos. 31, 32, 43, 44 and 46, respectively, and in-situ Formulation Nos. 73 and 74 in Table 10 below correspond to dry-blended Formulation Nos. 62 and 63, respectively.

TABLE 10

| Formulation No. | Cation Blend | C.O.R Molded | C.O.R. Finished | Spin Rate 9-Iron, RPM | Shore D Hardness |
|---|---|---|---|---|---|
| 68 | Na/Mn | .822 | .828 | 5,008 | 74 |
| 69 | Na/Li | .820 | .828 | 5,820 | 70 |
| 70 | Li/Zn | .820 | .825 | 5,425 | 71 |
| 71 | Li/Mg | .821 | .828 | 5,451 | 73 |
| 72 | Zn/K | .817 | .821 | 5,934 | 69 |
| 73 | Li/Zn/K | .822 | .826 | 5,266 | 71 |
| 74 | Na/Li/Zn | .821 | .824 | 5,165 | 71 |
| 75 | Iotek 959(Na)/960(Zn) | .819 | .824 | 5,926 | |
| Tour Edition® 100 | | | | 10,124 | |
| Tour Edition® 90 | | | | 9,821 | |
| Top-Flite® XL II | | | | 6,942 | |

The results indicated that little difference in C.O.R. was produced (relative to a control of 50/50 mixture of the high acid Iotek 959/960) whether a dry blending process or an in-situ blending process was used. Moreover, the data further clearly indicated that the cation neutralized acrylic acid based high acid ionomer blends of the present invention generally exhibit higher C.O.R. values and significantly lower spin rates than the best acrylic acid based high acid ionomers (i.e. the Ioteks 959 (Na)/960 (Zn) blend), see Formulation Nos. 68, 70, 71, 73 and 74 in comparison to Formulation No. 75 (control). The lower C.O.R. value and the substantially similar spin rate produced by the Zn/K blend in Formulation 72 was attributed to the slightly lower hardness of this blend versus the others. As indicated in Table 7, the K and Zn acrylic acid based high acid ionomers are a little softer than the Na, Mn, Li and Mg acrylic acid based high acid ionomers. Similarly, the higher spin rate of the Na/Li blend in Formulation 69 was due to its relative softness versus the other blends. In addition, other more subtle factors may also be at play, such as differences in coefficient of friction, deformation under load, etc., which have not quantified.

In addition, when compared with a number of commercially available balls produced by Spalding & Evenflo Companies, Inc., the assignee of the present invention, with low acid ionomer resin covers (i.e. the Tour Edition® 100, Tour Edition® 90 and Top-Flite® XL II balls), the spin rates of the cation neutralized acrylic acid high acid ionomer blends of the present invention (i.e. Formulations 68–75) exhibited much lower spin rates. Consequently, the cation neutralized acrylic acid based high acid ionomer blends of the present invention produced, when utilized to formulate the cover of a multi-layered golf ball, a much harder surface then those produced by the low acid ionomer covers presently available. This may be desirable to a golfer who imparts unmanageable spin (slice/hook) to the ball and thereofre may benefit from a "low spin" ball.

Example 3
Acrylic Acid Based High Acid Ionomer Di-Blends Containing Varying Ratios of Cation Neutralized Acrylic Acid Based High Acid Ionomers In addition to the 50/50 blends of various combinations of the new cation neutralized acrylic acid based high acid ionomers set forth in Example 1, di-blends varying from 25/75 to 75/25 ratios were produced utilizing the more preferred diblends in the "in-situ" process described in Example 2. In this regard, the more preferred diblend formulations set forth in Example 1 (i.e. Formulation No. 31 (Na/Mn), Formulation No. 32 (Na/Li), Formulation 43 (Li/Zn), Formulation No. 44 (Li/Mg), and Formulation No. 46 (Zn/K)) were produced in-situ in 50/50, 25/75 and 75/25 combinations according to the following formulations:

TABLE 11

| Ingredients | Formulations | | | | | | | | | |
|---|---|---|---|---|---|---|---|---|---|---|
| | 76 | 77 | 78 | 79 | 80 | 81 | 82 | 83 | 84 | 85 |
| Acid Copolymer (Primacor 5981) | 100 | 100 | 100 | 100 | 100 | 100 | 100 | 100 | 100 | 100 |
| NaOH | 2.0 | 1.0 | 3.0 | 2.0 | 1.0 | 3.0 | — | — | — | — |
| Mn Acetate | 15.0 | 22.5 | 7.5 | — | — | — | — | — | — | — |
| Lithium Hydroxide Monohydrate | — | — | — | 3.1 | 4.7 | 1.6 | 3.1 | 1.6 | 4.7 | 3.1 |
| Zinc Acetate | — | — | — | — | — | — | 8.00 | 12.0 | 4.0 | — |
| Potassium Hydroxide | — | — | — | — | — | — | — | — | — | — |
| Magnesium Acetate | — | — | — | — | — | — | — | — | — | 10.5 |

| Ingredients | Formulation No. | | | | |
|---|---|---|---|---|---|
| | 86 | 87 | 88 | 89 | 90 |
| Primacor 5981 | 100 | 100 | 100 | 100 | 100 |
| Lithium Hydroxide | 1.6 | 4.7 | — | — | — |
| Magnesium Acetate | 15.8 | 5.3 | — | — | — |
| Zinc Acetate | — | — | 8.00 | 12.0 | 4.0 |
| Potassium Hydroxide | — | — | 4.50 | 2.25 | 6.75 |

The di-blends produced the following C.O.R. values:

TABLE 12

| Formulation No. | Cation Blend | C.O.R. (Molded) |
|---|---|---|
| 76 | 50/50 Na/Mn | .820 |
| 77 | 25/75 Na/Mn | .821 |
| 78 | 75/25 Na/Mn | .825 |
| 79 | 50/50 Na/Li | .822 |
| 80 | 25/75 Na/Li | .822 |
| 81 | 75/25 Na/Li | .823 |
| 82 | 50/50 Li/Zn | .816 |
| 83 | 25/75 Li/Zn | .804 |
| 84 | 75/25 Li/Zn | .825 |
| 85 | 50/50 Li/Mg | .823 |
| 86 | 25/75 Li/Mg | .822 |
| 87 | 75/25 Li/Mg | .821 |
| 88 | 50/50 Zn/K | .820 |
| 89 | 75/25 Zn/K | .798 |
| 90 | 25/75 Zn/K | .821 |

Control is a 50/50 Iotek Low Acid Ionomer Blend (8000/7030), C.O.R. (molded) .817

The results indicated that in general the new cation neutralized acrylic acid based high acid ionomer diblends produced enhanced C.O.R. values over the known acrylic acid based low acid ionomer blends. See Formulation Nos. 76–81, 84–88 and 90. While Formulation 82 produced a lower C.O.R. value than expected, the data suggested that in some cases, a 50/50 blend is not optimal (particularly in the Zn/K and the Li/Zn blends), while in others (i.e. Li/Mg, Na/Li) the blend ratio is not significantly different.

Example 4

Since the data set forth in Examples 1–3 indicated the resilience (C.O.R.) and/or hardness properties of the cover compositions can be substantially enhanced through the use of the new cation neutralized acrylic acid based high acid ionomers and/or diblends or triblends of such ionomers, the molecular weight property of the acrylic acid/ethylene copolymers utilized to produce the ionomers was evaluated. Specifically, the molecular weight of the acid copolymers was assessed for the purpose of determining whether further enhanced properties can be produced by varying the molecular weight of the acid copolymer.

In this regard, since the data indicated that there was little difference between using the dry blending process or the in-situ blending method for processing the cations, the in-situ method of producing the cation neutralized high acid ionomer blends was used in this analysis.

Along this line, the diblend and triblends set forth in Formulation Nos. 68, 73 and 74 are essentially the same as those set forth below in Formulation Nos. 91, 94 and 97, respectively. However, since a different batch of cores was utilized than those used in Example 2, the C.O.R.'s are slightly lower. While the cores utilized in the present Example were of the same composition, the lower C.O.R. was due to the age of the cores, i.e. molded cores will lose C.O.R. upon aging mainly due to moisture pickup. Formulation Nos. 92–93, 95–96 and 98–99, are similar to those set forth in Formulation Nos. 91, 94 and 97, respectively, with the exception that the molecular weight of the acrylic acid/ethylene copolymer utilized was varied. Specifically, Primacor 5983 and Primacor 5990 both contain the same acid content as Primacor 5981 (i.e. 20 weight percent acrylic acid) but have lower viscosities (lower molecular weights) and lower densities. Primacor 5981 has a melt index of 300 g/10 minute (ASTM Method D-1238 at 190° C.) and a Brookfield viscosity of 51,000 cps at 350° F. Primacor 5983 has a melt index of 500 and a Brookfield viscosity of 26,000 cps at 350° F.; and Primacor 5990 has a melt index of 1300 and viscosity of 13,000 cps at 350° F.

The resilience (C.O.R.) of the molded balls produced utilizing the different molecular weight acrylic acid/ethylene copolymers are set forth below in Table 13.

TABLE 13

| Formulation No. | Cations | Acid Copolymer | C.O.R. (MOLDED) |
|---|---|---|---|
| 91 | Na/Mn | Primacor 5981 | .813 |
| 92 | Na/Mn | Primacor 5983 | .805 |
| 93 | Na/Mn | Primacor 5990 | All Balls crack |
| 94 | Li/Zn/K | Primacor 5981 | .814 |
| 95 | Li/Zn/K | Primacor 5983 | .809 |
| 96 | Li/Zn/K | Primacor 5990 | All Balls crack |
| 97 | Na/Li/Zn | Primacor 5981 | .813 |
| 98 | Na/Li/Zn | Primacor 5983 | .808 |
| 99 | Na/Li/Zn | Primacor 5990 | All Balls crack |

The data indicated that a higher molecular weight acid copolymer is preferred for obtaining high resilience (i.e. C.O.R.) and required toughness.

The invention has been described with reference to the preferred embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

Having thus described the preferred embodiments, the invention is now claimed to be:

1. A metal cation neutralized high acid ionomer resin comprising a copolymer of greater than 16% by weight of an alpha, beta-unsaturated carboxylic acid and the balance an alpha-olefin, of which about 10 to about 90% of the carboxyl groups of the copolymer are neutralized with a metal cation selected from the group consisting of manganese, lithium, potassium, calcium and nickel ions.

2. The metal cation neutralized high acid ionomer resin of claim 1, wherein said alpha, beta-unsaturated carboxylic acid is acrylic acid.

3. The metal cation neutralized high acid ionomer resin of claim 1, wherein said alpha-olefin is ethylene.

4. The metal cation neutralized high acid ionomer resin of claim 1, wherein said copolymer comprises from about 17% to about 25% by weight of an alpha, beta-unsaturated carboxylic acid.

5. The metal cation neutralized high acid ionomer of claim 1, wherein said copolymer comprises from about 18.5% to about 21.5% by weight of an alpha, beta-unsaturated carboxylic acid.

6. A metal cation neutralized high acid ionomer resin comprising a copolymer of about 20% by weight of an alpha, beta-unsaturated carboxylic acid and the balance an olefin, of which about 10 to about 90% of the carboxyl groups of the copolymer are neutralized with a metal cation selected from the group consisting of manganese, lithium, potassium, calcium and nickel ions.

7. The metal cation neutralized high acid ionomer resin of claim 6, wherein said alpha, beta-naturalized carboxylic acid is acrylic acid.

8. The metal cation neutralized high acid ionomer resin of claim 6, wherein said alpha-olefin is ethylene.

9. A metal cation neutralized high acid ionomer resin comprising a copolymer of about 20% by weight acrylic acid and the remainder ethylene, of which 10 to 90% of the carboxyl groups of the copolymer are neutralized with a metal cation selected from the group consisting of manganese, lithium, potassium, magnesium, calcium and nickel ions.

10. A metal cation neutralized high acid ionomer resin comprising a copolymer of about 20% by weight acrylic acid and the remainder ethylene, of which 10 to 90% of the carboxyl groups of the copolymer are neutralized with a metal cation selected from the group consisting of sodium, manganese, lithium, potassium, zinc, magnesium, calcium and nickel ions.

11. A method for producing a metal cation neutralized high acid ionomer resin comprising the steps of:
   a) providing a copolymer comprised of greater than 16% by weight of an alpha, beta-unsaturated carboxylic acid and an olefin; and
   b) neutralizing from about 10% to about 90% of the carboxylic acid groups of the copolymer with a metal cation selected from the group consisting of manganese, lithium, potassium, calcium and nickel ions.

12. The method of claim 11, wherein said copolymer comprises from about 17% to about 25% by weight of an alpha, beta-unsaturated carboxylic acid.

13. The method of claim 11, wherein said copolymer comprises from about 18.5% to about 21.5% by weight of an alpha, beta-unsaturated carboxylic acid.

14. The method of claim 11, wherein the alpha, beta-unsaturated carboxylic acid is acrylic acid.

15. The method of claim 11, wherein the olef in is ethylene.

16. The method of claim 11, wherein the neutralization is carried out at a temperature of from about 250° to about 500° F.

17. The method of claim 11, wherein the metal cation source is an acetate, oxide or hydroxide salt of manganese, lithium, potassium, calcium, magnesium or nickel.

18. The manganese neutralized high acid ionomer resin produced by the method of claim 11.

19. The lithium neutralized high acid ionomer resin produced by the method of claim 11.

20. The potassium neutralized high acid ionomer resin produced by the method of claim 11.

21. The metal cation neutralized high acid ionomer resin of claim 1 wherein the ionomer resin is water insoluble.

22. The metal cation neutralized high acid ionomer resin of claim 6 wherein the ionomer resin is water insoluble.

23. The metal cation neutralized high acid ionomer resin of claim 9 wherein the ionomer resin is water insoluble.

24. The metal cation neutralized high acid ionomer resin of claim 10 wherein the ionomer resin is water insoluble.

25. The metal cation neutralized high acid ionomer resin of claim 11 wherein the ionomer resin is water insoluble.

* * * * *